June 14, 1949.   G. SZEKELY   2,472,992
EVAPORATOR FOR THERAPEUTIC, STERILIZING
AND INSECTICIDAL LIQUIDS
Filed April 15, 1947
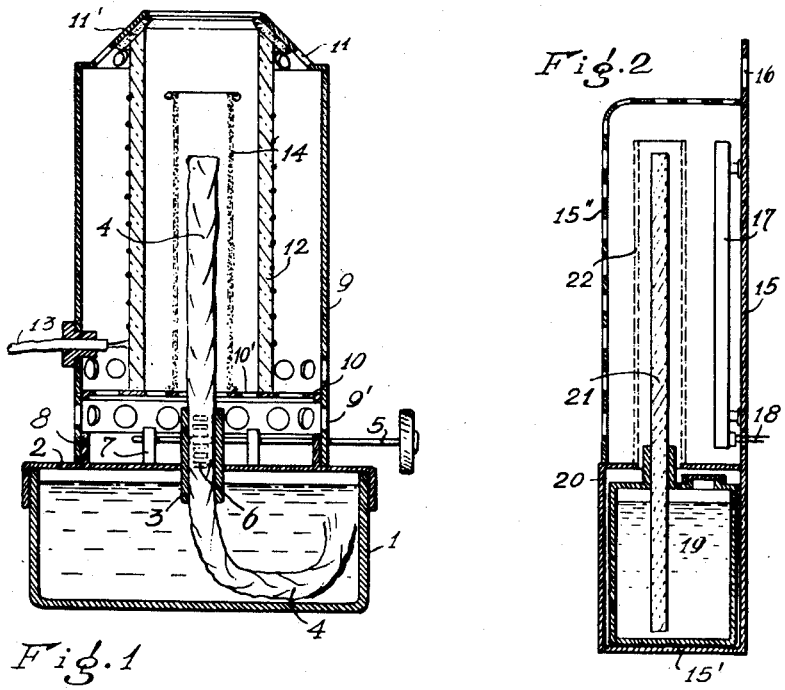
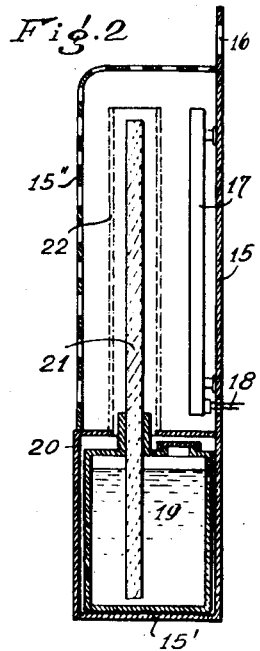
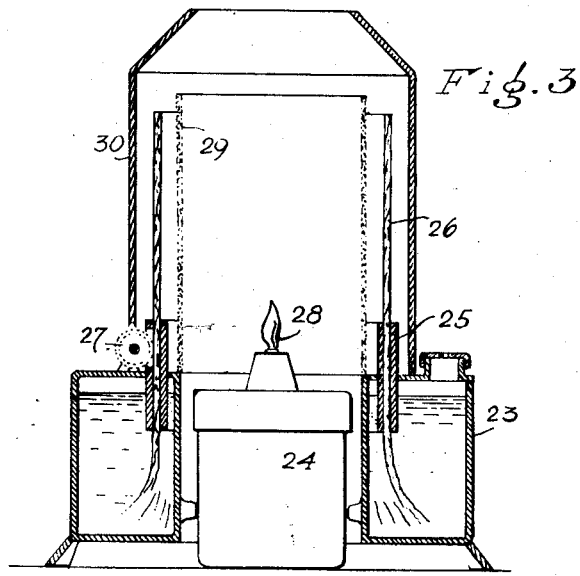
Inventor
George Szekely
By George Benjamin
Attorney.

Patented June 14, 1949

2,472,992

UNITED STATES PATENT OFFICE 2,472,992

EVAPORATOR FOR THERAPEUTIC, STERILIZING, AND INSECTICIDAL LIQUIDS

George Szekely, Tel Aviv, Palestine

Application April 15, 1947, Serial No. 741,570

Section 1, Public Law 690, August 8, 1946
Patent expires March 17, 1966

3 Claims. (Cl. 21—117)

The invention relates to means for the evaporation of liquids for hygienic, medicinal, insecticidal or the like purposes. The liquids are as a rule poured into a receptacle which is then heated by electricity or an open flame. It is in this case necessary to provide a thermostat or some other means for controlling the heating temperature which is to be kept, as far as possible, constant in order to obtain a pretty uniform evaporation. But in most cases the liquids are solutions of different substances of different degrees of volatility with the result that the composition and the quantity of the engendered vapors continually change. But the liquids are in most cases solutions of different substances of different degrees of volatility. Owing to this fact the more volatile ingredients evaporate first while the less volatile ones remain for subsequent evaporation. Very often a more or less solid residue subsides. This not uniform evaporation of the solution does not comply with the aims pursued, the residue necessitates a thorough cleaning operation and the heating of the receptacles makes their handling difficult and even dangerous.

The invention aims at an elimination of the inconveniences indicated and affords additionally some valuable advantages. The invention resides in principle in the steps of immersing one part of a liquid absorbing body such as an asbestos wick or a plate of porous clay or the like liquid absorbing material into the liquid and exposing its other part which projects out of the liquid to heating. By this means the heating of the receptacle and of the whole contents therein are obviated, and only a certain small quantity of the liquid, which is absorbed by the wick or the like, is subject to evaporation. The wick itself or the like serves as a conveyor for the liquid and as an evaporator and is itself not combustible.

The liquid evaporates without being liable to overheating above the evaporation temperature, as it often happens in case the receptacle itself is heated. The nature and the volume of the produced vapors remain constant during the whole operation of the device, the liquid receptacle of which may—in contradistinction to the known related devices—be of any considerable size, so as to necessitate a refilling only at relatively great time intervals.

The device can be of a very simple construction. For heating the wick advantageously an electric heating element may be used, but any other suitable heating means, as for instance a kerosene burner, may be employed. The degree of evaporation can be easily varied by varying the size of the wick or the like or of its surface exposed to heat or of its distance from the heating means. Such a device needs no complicated mechanism, is reliable in operation and can be easily handled.

The invention will be especially useful in connection with liquids suitable for inhalation, improving the air and repelling or killing of insects.

The device according to the invention is shown in the drawing by way of example in three different embodiments in vertical sections.

Fig. 1 shows a device equipped with a round wick and a cylindrical electric heating element.

Fig. 2 shows a device equipped with a clay-plate and a flat electric heating element.

Fig. 3 shows a device equipped with a kerosene burner and a cylindrical wick.

Adverting first to Fig. 1, the receptacle for the liquid to be evaporated is denoted by the numeral 1. The receptacle has a cover 2, in the middle of which there is arranged a short vertical tube 3. Into the tube is inserted a wick 4, so that the lower part of the wick is immersed into the liquid contained in the receptacle, while its upper part projects above that receptacle. The length of the projecting part of the wick can in the way well known with kerosene lamps be regulated by means of a hand operated spindle 5 and a toothed wheel 6 fixed thereon and entering through a slot of the tube into the latter. The spindle 5 is journalled in bearings 7 provided on cover 2. On cover 2 is further arranged a ring 8, onto which the lower end of a cylinder 9 can be slid. Cylinder 9 thus rests on cover 2 of receptacle 1. Cylinder 9 has in its lower part a perforated bottom 10 and its upper end is shaped as a truncated cone 11. Between the bottom 10 and the cone 11, there is erected a concentric electric heating element 12, to which the current is supplied through lead 13. A cylindrical wire net 14 is inserted between heating element 12 and wick 4, so as to prevent any contact between them. An asbestos ring 11' is interposed between heating element 12 and cone 11 to prevent over-heating of cylinder 9.

The heating element being switched on, the wick is heated by radiation, and the absorbed liquid evaporates. The vapours mix with air and rise, while fresh air comes from below through openings 9' of the cylinder 9 and openings 10' of bottom 10. When the heating element is switched off, the evaporation ceases. The degree of evaporation can be controlled by means of the hand spindle 5, so as to expose at will any length of wick to heating. It is apparent, that the receptacle 1 and its contents remain always cool. The receptacle can be refilled after removal of its cover 2.

The arrangement shown in Fig. 1 is destined to be placed on a table, while the device shown in Fig. 2 is adapted to be attached to a wall. A bracket 15 is provided with an eye 16 so that it can be suspended on the wall. The bracket is equipped with a flat electrical heating element 17 to which current is supplied through lead 18. The lower part of the bracket 15 is formed by a laterally open enclosure 15', into which the receptacle 19 containing the liquid to be evaporated, is inserted. Receptacle 19 has in its top wall a narrow quadrangular guide tube 20, through which the lower part of a porous plate 21 of porous clay is introduced, while the upper part of this plate projects above the enclosure 15' and lies parallel to the flat heating element 17. A laterally open wire net 22 rests on the top wall of enclosure 15' and prevents any accidental contact of plate 21 with heating element 17. A perforated cover 15" may be placed on said top wall to keep away flies or the like and to protect the parts against unauthorized interference. The porous plate 21 sucks the liquid from the receptacle 19 and exposes it to the heat radiating from the element 17.

The device shown in Fig. 3 is equipped with a tubular wick 26 and a kerosene burner 24. The liquid receptacle 23 has a ring-like shape. The burner 24 is placed in the centre of the ring. Two short concentric spaced rings 25 fixed in the top wall of the receptacle 23 form the guide for the tubular wick 26, the lower end of which merges into the liquid. The wick can in the usual way be lowered or raised by means of a hand operated spindle 27 provided with a toothed wheel engaging the wick through a slot in the outer tube 25. A cylindrical wire net 29 is seated on the top wall of the receptacle. The open flame burner can be replaced by an electric lamp. All parts above the receptacle are enclosed within a protective cylinder 30. The produced vapours rise in the cylinder and escape therefrom, while fresh air enters into the device through the gap between the inner wall of the ring-like receptacle and the burner 24.

The illustrated embodiments of the invention are designed to represent the principle underlying the invention, in the practical application of the invention, the apparatus will in their construction and operation be adapted to the particular purpose envisaged. E. g. for inhalation purposes the device will be provided with an appropriate tube leading to respiratory organs. If several adjoining rooms are to be protected against insects, a central installation may be devised from which the liquid or vapours are led through branched off tubes into the separate rooms. If the liquid is so distributed, the wicks can be inserted into said tubes. The electric heating elements can likewise be controlled from the central station, whereby the whole installation as well as the individual apparatus can be highly simplified.

What I claim is:

1. In a device for evaporating liquids for hygienic, medicinal, insecticidal and the like purposes, a receptacle for the liquid to be evaporated, a liquid absorbent body projecting partly into and partly out of the receptacle and means for heating by radiation the part of the absorbent body which projects out of the receptacle.

2. In a device for evaporating liquids for hygienic, medicinal, insecticidal and the like purposes, a receptacle for the liquid to be evaporated, a length of a liquid absorbent body projecting partly into and partly out of the receptacle, means for heating by radiation the part of the absorbent body which projects out of the receptacle, and a wire net arranged between the projecting part of the absorbent body and the heating means and in spaced relation to these two elements.

3. In a device as claimed in claim 2, means for regulating the length of the absorbent body which projects out of the receptacle.

GEORGE SZEKELY.

REFERENCES CITED

The following references are of record in the file of this patent:

UNITED STATES PATENTS

| Number | Name | Date |
|---|---|---|
| 2,152,466 | Clyne | Mar. 28, 1939 |